(12) United States Patent
Shargots et al.

(10) Patent No.: US 12,300,396 B2
(45) Date of Patent: May 13, 2025

(54) CONTROL ROD REMOTE HOLDOUT MECHANISM

(71) Applicant: BWXT Advanced Technologies LLC, Lynchburg, VA (US)

(72) Inventors: Scott J. Shargots, Forest, VA (US); Ryan Z. Ziegler, Forest, VA (US); Emily D. Fleming, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 242 days.

(21) Appl. No.: 17/977,777

(22) Filed: Oct. 31, 2022

(65) Prior Publication Data

US 2023/0133343 A1    May 4, 2023

Related U.S. Application Data

(60) Provisional application No. 63/273,694, filed on Oct. 29, 2021.

(51) Int. Cl.
*G21C 7/14*    (2006.01)
*G21C 7/117*   (2006.01)

(52) U.S. Cl.
CPC ........... *G21C 7/14* (2013.01); *G21C 7/117* (2013.01)

(58) Field of Classification Search
CPC . G21C 7/12; G21C 7/10; G21C 7/117; G21C 7/14; G21C 19/10
See application file for complete search history.

(56) References Cited

U.S. PATENT DOCUMENTS

| 3,046,906 A | * | 7/1962 | Budzich | G21C 7/02 91/487 |
| 3,741,867 A | * | 6/1973 | Fortescue | G21C 7/20 976/DIG. 129 |
| 3,822,439 A | * | 7/1974 | Wallin | F16H 25/2266 376/234 |

(Continued)

FOREIGN PATENT DOCUMENTS

| CN | 112071446 A | * | 12/2020 | G21C 7/16 |
| GB | 874222 A | * | 8/1961 | |
| WO | WO-2023076676 A1 | * | 5/2023 | G21C 7/117 |

OTHER PUBLICATIONS

International Search Report and Written Opinion, PCT/US22/48423, dated Feb. 9, 2023, 16 pages.

*Primary Examiner* — Lily C Garner
(74) *Attorney, Agent, or Firm* — Nelson Mullins Riley & Scarborough LLP

(57) ABSTRACT

A control rod drive mechanism having a torque tube with an inner surface defining a central bore, a control rod assembly including a connecting rod including a cam extending radially-outwardly therefrom and an annular collar defining a key slot, an elongated key that is slidably receivable within the key slot, and a holdout collar disposed non-rotatably within the torque tube and defining a locking recess, wherein the connecting rod is axially-movable with respect to the torque tube between a first position in which the elongated key is disposed within the key slot so that the connecting rod is non-rotatable with respect to the torque tube, and a second position in which the elongated key is removed from the key slot and the connecting rod is rotatable with respect to the torque tube.

17 Claims, 7 Drawing Sheets

(56) References Cited

U.S. PATENT DOCUMENTS

| | | | | |
|---|---|---|---|---|
| 4,147,589 | A * | 4/1979 | Roman | G21C 7/12 |
| | | | | 376/233 |
| 4,646,414 | A * | 3/1987 | Wilson | G21C 3/334 |
| | | | | 29/723 |
| 4,778,645 | A * | 10/1988 | Altman | G21C 19/00 |
| | | | | 376/233 |
| 5,141,711 | A * | 8/1992 | Gjertsen | G21C 7/117 |
| | | | | 376/233 |
| 5,513,229 | A * | 4/1996 | Willems | G21C 7/16 |
| | | | | 376/258 |
| 5,761,260 | A * | 6/1998 | Bergamaschi | G21C 7/12 |
| | | | | 376/233 |
| 8,483,346 | B2 * | 7/2013 | McCarty | G21C 7/117 |
| | | | | 376/327 |
| 8,526,563 | B2 * | 9/2013 | Shargots | G21C 7/12 |
| | | | | 376/239 |
| 9,025,720 | B2 * | 5/2015 | Tylman | G21C 19/115 |
| | | | | 376/260 |
| 10,096,388 | B2 * | 10/2018 | Shargots | G21C 7/12 |
| 10,102,933 | B2 * | 10/2018 | Walton | G21C 7/14 |
| 10,600,518 | B2 * | 3/2020 | Shargots | G21C 7/12 |
| 2011/0222640 | A1 * | 9/2011 | DeSantis | G21C 7/14 |
| | | | | 376/229 |
| 2012/0051482 | A1 * | 3/2012 | Shargots | G21C 7/117 |
| | | | | 376/219 |
| 2013/0272464 | A1 * | 10/2013 | Walton | G21C 7/20 |
| | | | | 376/225 |
| 2021/0330954 | A1 | 10/2021 | Zergiebel et al. | |
| 2023/0137322 | A1 * | 5/2023 | Shargots | G21C 7/10 |
| | | | | 376/233 |

\* cited by examiner

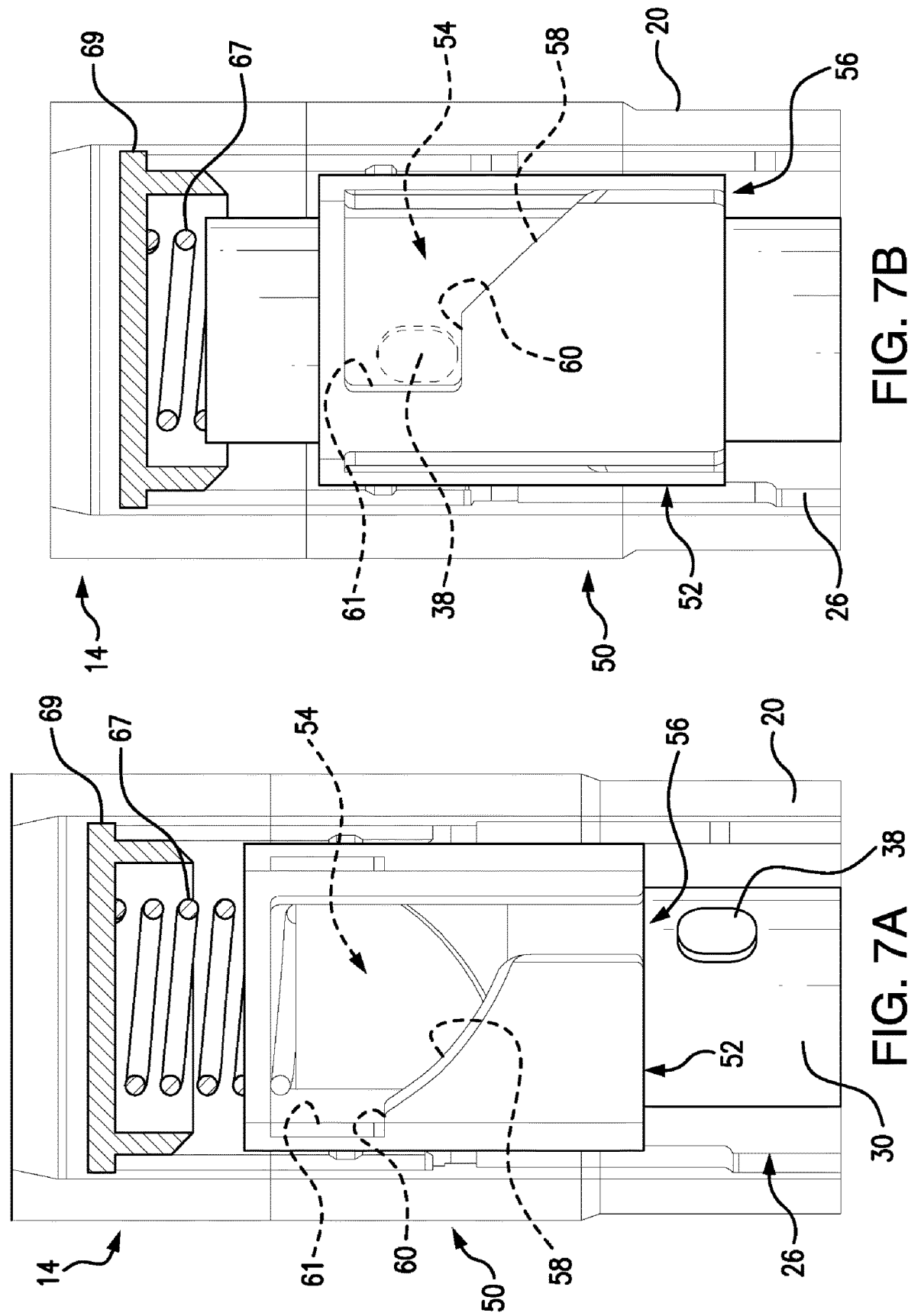

CONTROL ROD REMOTE HOLDOUT MECHANISM

CLAIM OF PRIORITY

This application claims priority to U.S. provisional patent application No. 63/273,694 filed Oct. 29, 2021, the disclosure of which is incorporated by reference herein.

TECHNICAL FIELD

The presently disclosed invention relates generally to systems and methods of use thereof for controlling reactor power levels in nuclear reactors and, more specifically, to systems and methods of use thereof for controlling the operation of control rods for nuclear thermal reactors.

BACKGROUND

In thermal nuclear power plants, a nuclear reactor core comprises a fissile material having size and composition selected to support a desired nuclear fission chain reaction. The core is disposed in a pressure vessel immersed in primary coolant water. It is further known to control or stop the reaction by inserting "control rods" comprising a neutron-absorbing material into guide tubes passing through the reactor core. When inserted, the control rods absorb neutrons so as to slow or stop the chain reaction.

The control rods are operated by control rod drive mechanisms (CRDMs). With "regulating" control rods, the insertion of the control rods is continuously adjustable so as to provide continuously adjustable reaction rate control. For "shutdown" control rods, the insertion is either fully in or fully out. During normal operation the shutdown rods are fully retracted from the reactor core, whereas during a SCRAM, the shutdown rods are fully inserted so as to rapidly stop the chain reaction. Control rods can also be designed to perform both regulating and shutdown rod functions. In some such dual function control rods, the control rod is configured to be detachable from the CRDM in the event of a SCRAM, such that the detached control rod falls into the reactor core under the influence of gravity. In some systems, such as naval systems, a hydraulic pressure or other positive force (other than gravity) is also provided to drive the detached control rods into the core.

To complete the control system, a control rod/CRDM coupling is provided. A known coupling includes a connecting rod having a lower end at which a spider is secured. The upper portion of the connecting rod operatively connects with the CRDM. In regulating rods, this connection includes a lead screw or other incremental adjustment element. Conventionally, the lead screw scrams with the connecting rod, spider, and control rods as a translating assembly (also known as the "control rod assembly"). In some known approaches, however, the lead screw may be retained in the CRDM and the remainder of the control rod assembly scrams. To reduce cost and overall system complexity, a single CRDM is typically connected with a plurality of control rods via a spider. In this arrangement, all the control rods coupled with a single spider together as a translating control rod assembly (CRA). In practice a number of CRDM units are provided, each of which is coupled with a plurality of control rods via a spider, so as to provide some redundancy. The spider extends laterally away from the lower end of the connecting rod to provide attachment points for multiple control rods.

During certain operations, for example, shutdown core removal, etc., it may be required that the translating CRAs be fully withdrawn from the reactor core for extended periods of time. As such, it is desirable to have the ability to remotely engage and disengage the translating CRAs at a fixed location, such as by vertical motion of those CRAs.

SUMMARY OF INVENTION

One embodiment of the present disclosure provides a control rod drive mechanism having a torque tube with an inner surface defining a central bore, a control rod assembly including a connecting rod disposed within the central bore of the torque tube, the connecting rod including at least one cam extending radially-outwardly from an outer surface thereof, and an annular collar defining a key slot, an elongated key that is slidably receivable within the key slot, the elongated key being non-rotatably fixed to the inner surface of the torque tube, and a holdout collar disposed non-rotatably within the torque tube, the holdout collar including an inner surface defining a central bore and at least one locking recess therein, the locking recess including an entry slot extending upwardly from a bottom edge of the holdout collar, wherein the connecting rod is axially-movable with respect to the torque tube between a first position in which the elongated key is disposed within the key slot so that the connecting rod is non-rotatable with respect to the torque tube, and a second position in which the elongated key is removed from the key slot and the connecting rod is rotatable with respect to the torque tube.

Another embodiment of the present disclosure provides a holdout mechanism for use with a control rod drive mechanism having a torque tube, including a connecting rod with at least one cam extending radially-outwardly from an outer surface of the connecting rod, and an annular collar defining a key slot, the annular collar extending radially-outwardly from the outer surface of the connecting rod, an elongated key that is slidably receivable within the key slot, the elongated key being non-rotatably fixed to an inner surface of the torque tube, and a holdout collar disposed non-rotatably within the torque tube, the holdout collar including an inner surface defining a central bore and at least one locking recess therein, the locking recess extending upwardly from a bottom edge of the holdout collar, wherein the connecting rod is axially-movable with respect to the control rod drive mechanism between a first position in which the elongated key is disposed within the key slot so that the connecting rod is non-rotatable with respect to the control rod drive mechanism, and a second position in which the elongated key is removed from the key slot and the connecting rod is rotatable with respect to the control rod drive mechanism.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

FIGS. 7A and 7B are partial cutaway side views of the holdout mechanism of the control rod drive mechanism shown in FIG. 4, in the engaged and disengaged states, respectively.

Figure 1:
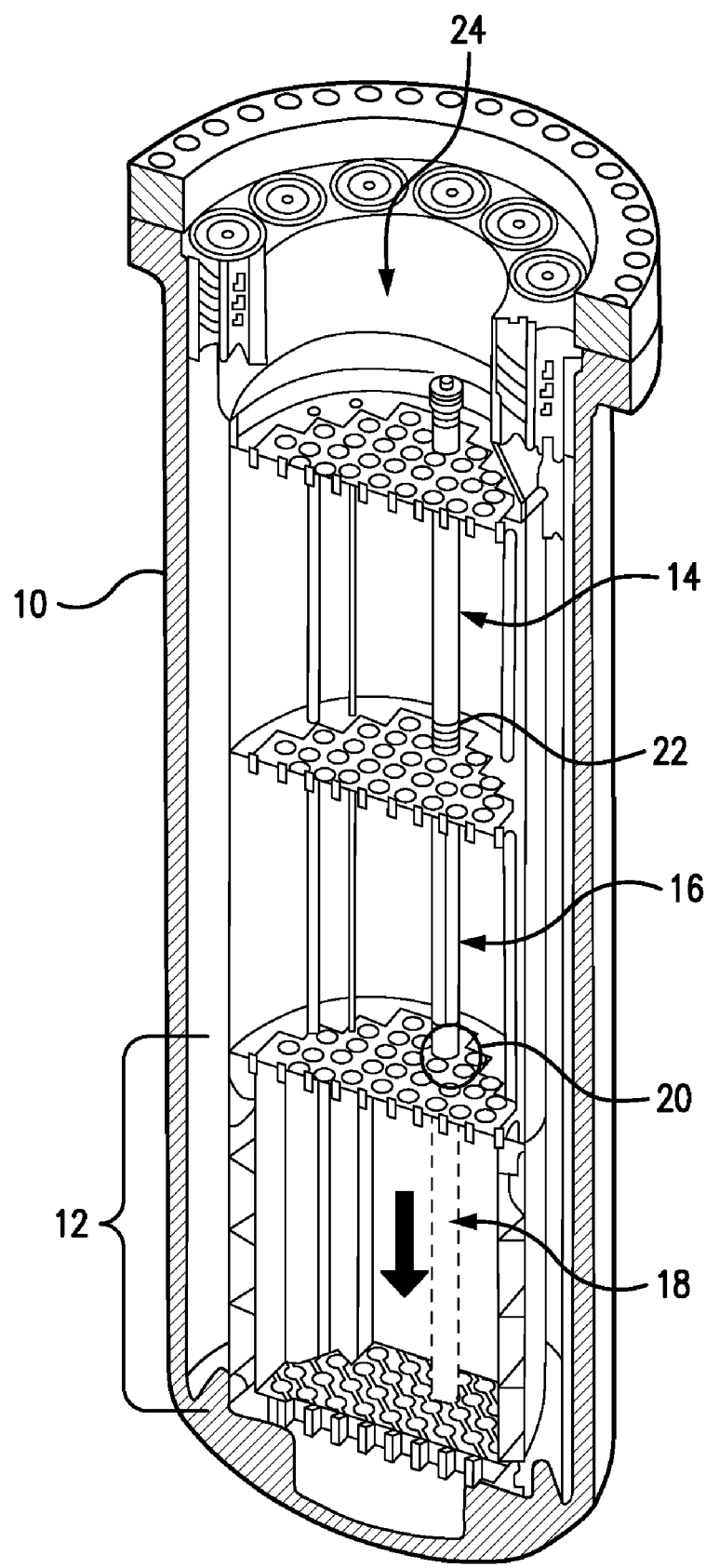
FIG. 1 is a partial perspective, cross-sectional view of a lower portion of a nuclear reactor pressure vessel including an illustrative control rod assembly.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the control rod assembly including a remote holdout mechanism, such as but not limited to "vertical," "horizontal," "upper," "lower," "above," or "below," refer to directions and relative positions with respect to the disconnect mechanism's orientation in its normal intended operation, as indicated in the Figures herein. Thus, for instance, the terms "vertical" and "upper" refer to the vertical direction and relative upper position in the perspectives of the Figures and should be understood in that context, even with respect to a reactor that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

With reference to FIG. 1, a relevant portion of an illustrative nuclear reactor pressure vessel 10 includes a reactor core 12 located proximate to a bottom of the pressure vessel 10. The core 12 includes or contains radioactive material such as, by way of illustrative example, enriched uranium oxide (that is, $UO_2$ processed to have an elevated $^{235}U/^{238}U$ ratio). A control rod drive mechanism (CRDM) 14 assembly is diagrammatically illustrated. The illustrative CRDM 14 is an internal CRDM that is disposed within the pressure vessel 10. In alternate embodiments, an external CRDM may be employed. Typically, there are multiple CRDM units each coupled with a plurality of control rods, although these additional CRDM units are not shown in FIG. 1. The pressure vessel 10 is drawn showing the space for such additional CRDM units.

Figure 3:
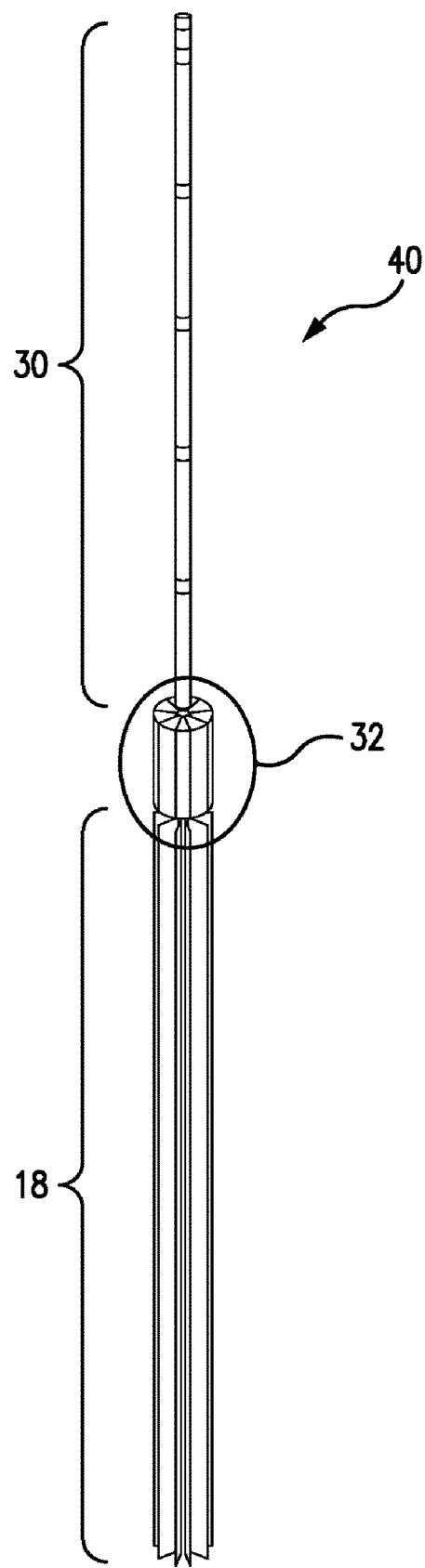
FIG. 3 is a perspective view of the control rods and the connecting rod of the control rod assembly shown in FIG. 2.

Below the CRDM 14 is a control rod guide frame 16, which in the perspective view of FIG. 1 blocks from view the control rod/CRDM coupling assembly (i.e., the spider 32 and connecting rod 30, both shown in FIG. 3). Extending below the guide frame 16 is a plurality of control rods 18. FIG. 1 shows the control rods 18 in their fully inserted position in which the control rods 18 are maximally inserted into the core 12. In the fully inserted position, the spider 32 (FIG. 3) is located at a lower location 20 within the control rod guide frame 16. In the illustrative embodiment of FIG. 1, the CRDM 14 and the control rod guide frame 16 are spaced apart by a standoff 22 comprising a hollow tube having opposite ends coupled with the CRDM 14 and the guide frame 16, respectively, and through which the connecting rod 30 (FIG. 3) passes.

Figure 2:
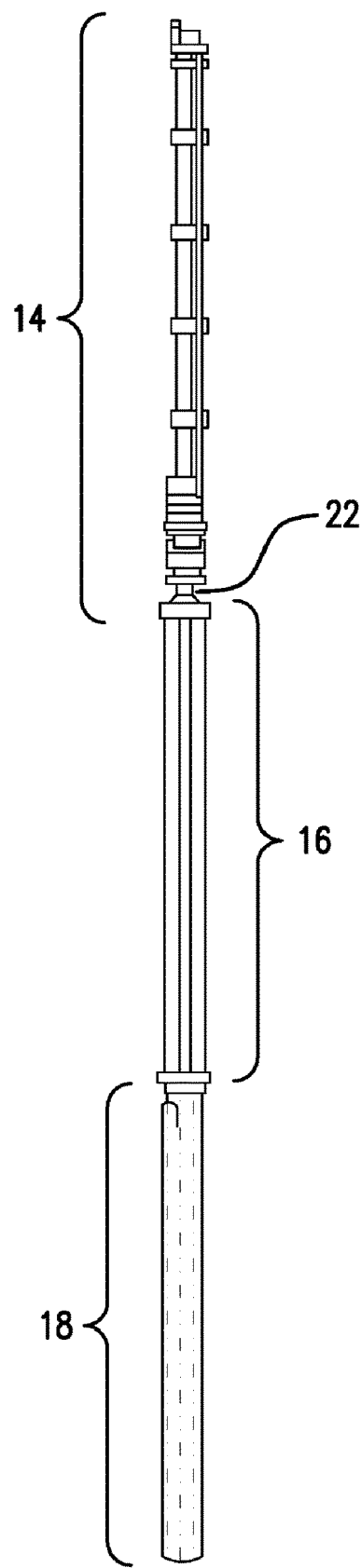
FIG. 2 is a side view of the control rod assembly shown in FIG. 1.

FIG. 1 shows only a lower portion of the illustrative pressure vessel 10. In an operating nuclear reactor, an open upper end 24 of the illustration is connected with one or more upper pressure vessel portions that together with the illustrated lower portion of the pressure vessel 10 forms an enclosed pressure volume containing the reactor core 12, the control rods 18, the guide frame 16, and the internal CRDM 14. In an alternative embodiment, the CRDM is external, located above the reactor pressure vessel. In such embodiments, the external CRDM is connected with the control rods 18 by a control rod/CRDM coupling assembly in which the connecting rod 30 extends through a portal in the upper portion of the pressure vessel. With reference to FIG. 2, the control assembly including the CRDM 14, the control rod guide frame 16, the intervening standoff 22, and the control rods 18 is illustrated isolated from the reactor pressure vessel. With reference to FIG. 3, the control rods 18 and the connecting rod 30 of the control rod assembly 40 are shown without any of the occluding components (e.g., without the guide frame, standoff, or CRDM). The spider 32 provides connection of the plurality of control rods 18 with the lower end of the corresponding connecting rod 30.

Figure 4:
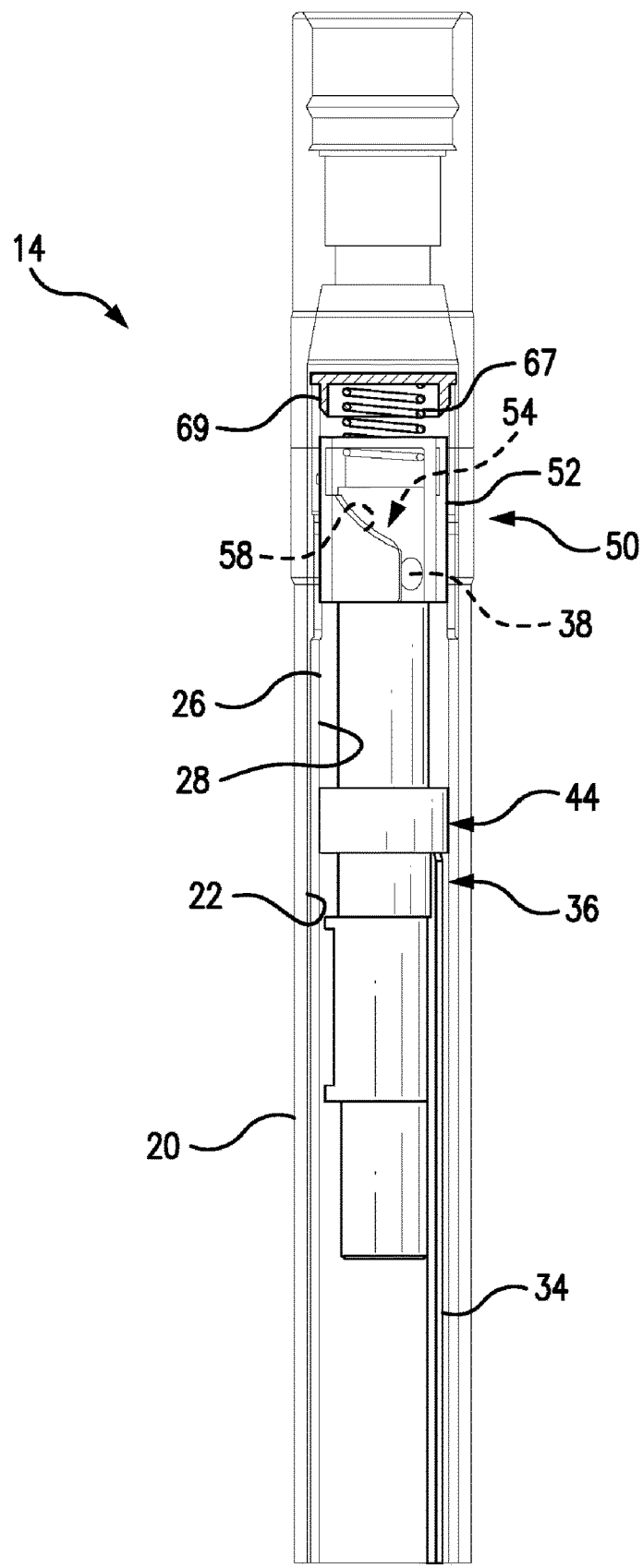
FIG. 4 is a partial cut-away side view of a control rod drive mechanism including a holdout mechanism in accordance with an embodiment of the present disclosure.

Referring now to FIG. 4, a holdout assembly 50 in accordance with the present disclosure is shown. The holdout assembly 50 includes a holdout collar 52 that is non-rotatably secured within a central bore 28 of the torque tube 26 of the control rod drive mechanism 14. Further, the torque tube 26 is non-rotatably secured within a central bore 22 of a motor tube 20 of the control rod drive mechanism 14. As discussed in greater detail below, the holdout collar 52 (FIGS. 6A and 6B) includes at least one locking recess 54 that is configured to selectively receive a cam 38 that is formed by a projection that extends radially-outwardly from a top end 33 of the connecting rod 30 of the control rod assembly 40 (FIG. 3). Although embodiments of the holdout assembly 50 may include as few as one locking recess 54 and one corresponding cam 38, it is preferable that the holdout assembly 50 include at least a pair of opposed locking recesses 54 and a pair of corresponding opposed locking cams 38, as is shown in the present embodiment.

Figures 5A, 5B:
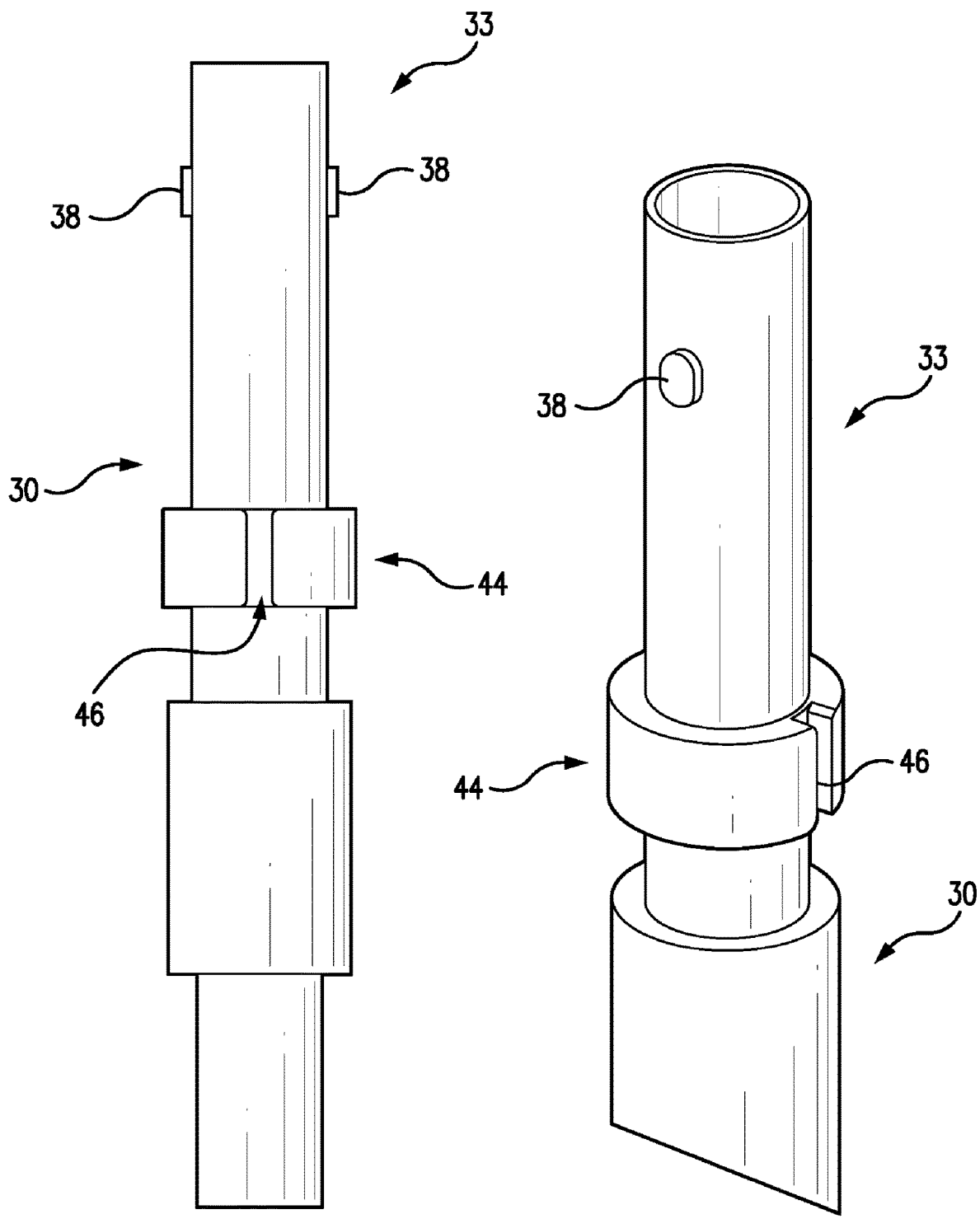
FIGS. 5A and 5B are a side view and a perspective view, respectively, of the top end of the connecting rod of the control rod drive mechanism shown in FIG. 4.

Referring now to FIGS. 5A and 5B, in addition to the pair of cams 38, the top end 33 of the connecting rod 30 also includes an annular collar 44 that defines an axially extending key slot 46 therein. The annular collar 44 extends radially-outwardly from the outer surface of the connecting rod 30 and is disposed below the pair of locking cams 38. As discussed in greater detail below, the key slot 46 of the annular collar 44 is configured to slidably receive an elongated key 34 therein. As shown in FIG. 4, the elongated key 34 is non-rotatably affixed to the inner surface of the central bore 28 of the torque tube 26. As such, when the elongated key 34 is received within the key slot 46 of the annular collar 44, the connecting rod 30 is non-rotatably fixed to the torque tube 26. However, when the elongated key 34 is not received within the key slot 46, the connecting rod 30 is free to rotate with respect to the torque tube 26 when the control rod assembly 40 is being moved vertically by the control rod drive mechanism 14. As is known in the art, friction forces between the lead screw (not shown) of a control rod assembly 40 and the roller nuts of a control rod drive mechanism 14 cause the connecting rod 30 to rotate with respect to the torque tube 26. The direction of rotation of the connecting rod 30 with respect to the torque tube 26 is dependent upon the direction of axial travel of the connecting rod 30 with respect to the torque tube 26. For example, in the instant case, when the control rod drive mechanism 14 is viewed from above and the connecting rod 30 is moved upwardly, the connecting rod 30 will rotate in the clockwise direction with respect to the torque tube 26. Conversely, when the connecting rod 30 is moved downwardly with respect to the torque tube 26, the connecting rod 30 will rotate in the counter-clockwise direction with respect to the torque tube 26.

Figure 6A:
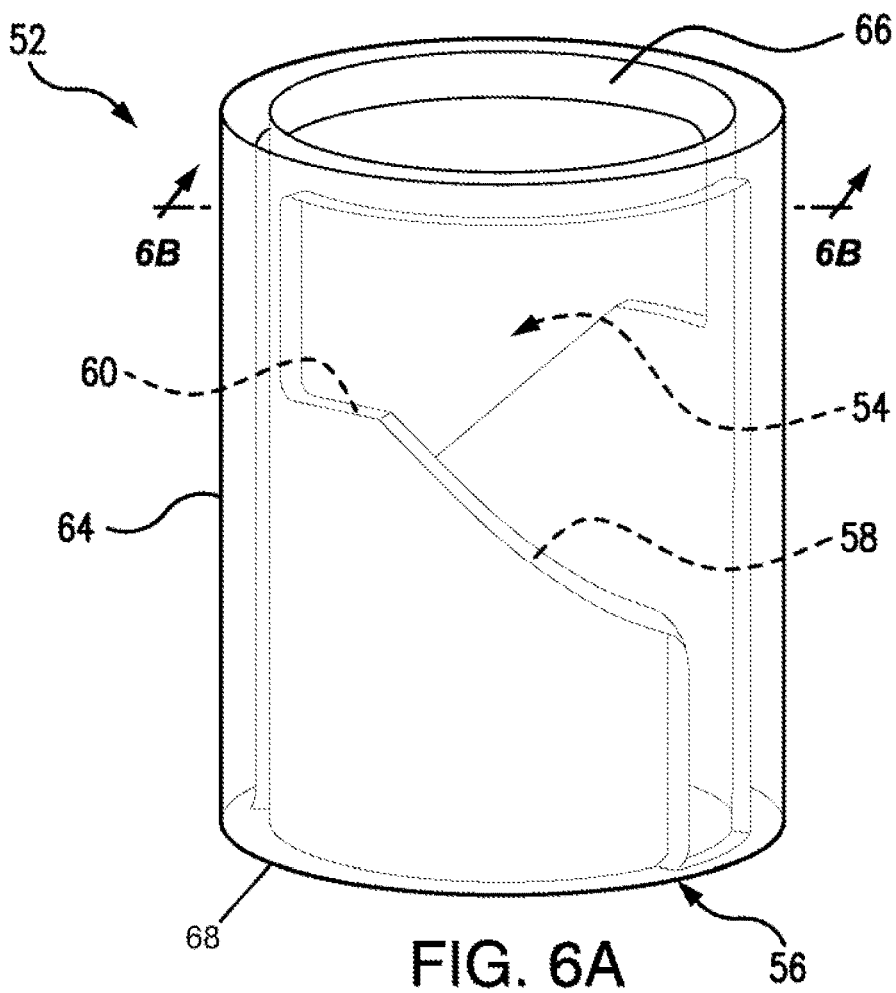
FIGS. 6A and 6B are a perspective view and a cross-sectional view, respectively, of the holdout collar of the control rod drive mechanism shown in FIG. 4.
Figure 6B:
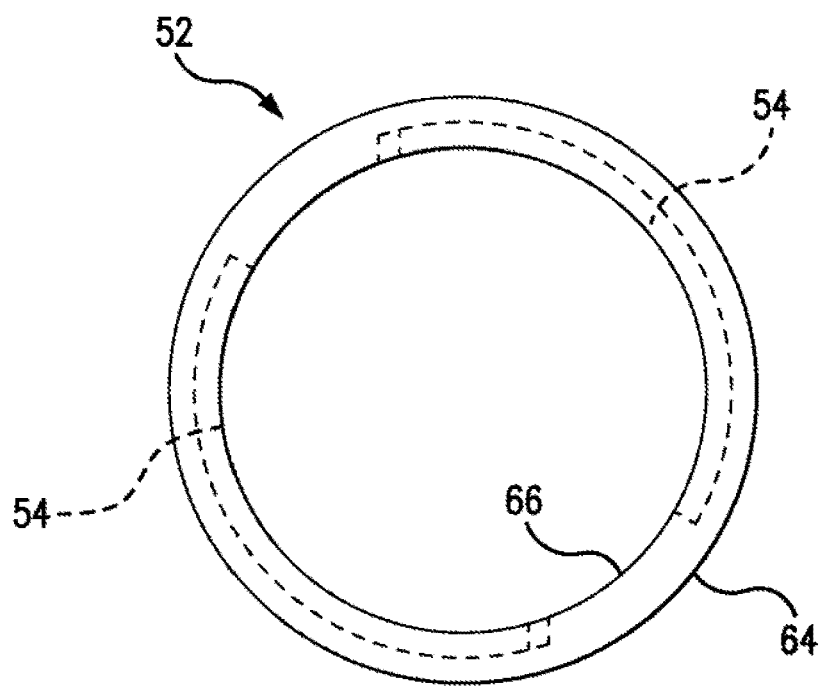

As shown in FIGS. 6A and 6B, the holdout collar 52 is formed by concentric outer and inner surfaces 64 and 66, respectively. In the embodiment shown, each locking recess 54 is defined in the inner surface 66 of the holdout collar 52 and includes an entry slot 56, a lock surface 60, and a camming surface 58 that extends therebetween. As shown, the entry slot 56 extends upwardly from a bottom edge 68 of the holdout collar 52 and is configured to slidably receive a corresponding locking cam 38 therein. The holdout collar 52 is non-rotatably fixed at the top end of the central bore 28 of the torque tube 26, as shown in FIG. 4.

Referring to FIGS. 4, 7A, and 7B, operation of the holdout assembly 50 is now discussed. As shown in FIG. 7A, during normal reactor operations, the locking cams 38 of the holdout assembly 50 are disposed below the holdout collar 52 so that the holdout collar 52 is not engaged with the connecting rod 30 of the control rod assembly 40. Referring additionally to FIG. 4, when the locking cams 38 are disposed below the holdout collar 52, the elongated key 34 is disposed within the key slot 46 of the connecting rod 30 such that the locking cams 38 are aligned with the entry slots 56 of the corresponding locking recesses 54. When an operator desires to engage the control rod assembly 40 (FIG. 3) with the holdout assembly 50, the control rod drive mechanism 14 is utilized to move the control rod assembly 40 within the torque tube 26. As noted, interaction of the elongated key 34 with the key slot 46 maintains alignment of the locking cams 38 with the corresponding entry slots 56 of the locking recesses 54. As shown in FIG. 4, once the locking cams 38 have entered the corresponding entry slots 56, upward motion of the connecting rod 30 causes the annular collar 44 to move upwardly beyond a top end 36 of the elongated key 34, meaning that interaction between the elongated key 34 and the key slot 46 no longer prevent rotation of the connecting rod 30 with respect to the torque tube 26 of the control rod drive mechanism 14. Note, however, as shown in FIG. 4, rotation of the connecting rod 30 with respect to the torque tube 26 is still prevented by interaction of the locking cams 38 with the side walls of the corresponding entry slots 56 of the locking recesses 54.

Continued upward movement of the connecting rod 30 with respect to the torque tube 26 causes the locking cams 38 to exit the top ends of the entry slots 56, thereby allowing the connecting rod 30 to rotate with respect to the torque tube 26 and, therefore, holdout collar 52. As such, the locking cams 38 ride along the corresponding camming surfaces 58 of the locking recesses 54 until reaching the upper end thereof, at which point the locking cams 38 ride along the lock surfaces 60 until abutting the stop surfaces 61 of the locking recesses 54. Note, prior to the locking cams 37 reaching the upper end of the corresponding camming surfaces 58, the top end of the connecting rod 30 comes into contact with coil spring 67, which is seated in end cap 69. Coil spring 67 maintains a downward force on connecting rod 40 as it is compressed. When locking cams 38 come to rest on lock surfaces 60, the control rod drive mechanism 14 may be de-energized, with the weight of the control rod assembly 40 being supported by the locking cams 38 resting upon the locking surfaces 60 of the holdout collar 52, as shown in FIG. 7B.

To return to normal operation, the control rod drive mechanism 14 is energized and the lead screw of the control rod assembly 40 is engaged to move the assembly in a downward direction. As previously noted, friction between the roller nuts (not shown) of the control rod drive mechanism 14 and the lead screw (not shown) of the control rod assembly 40 will cause the connecting rod 30 to rotate the counter-clockwise direction when viewed from above. As such, the locking cams 38 slide along the lock surfaces 60 and then downwardly along the camming surfaces 58 until the locking cams 38 enter the corresponding entry slots 56 of the locking recesses, as shown in FIG. 4. When the locking cams 38 are disposed within the entry slots 56, the key slot 46 of the connecting rod collar 44 is axially aligned with the elongated key 34 such that further downward motion of the control rod assembly causes the elongated key 34 to be slidably received in the key slot. As such, rotation of the connecting rod 30 with respect the torque tube 26 of the control rod drive mechanism is prevented. An operator is now free to manipulate the control rod assembly 40 as required by desired reactor conditions.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:
1. A control rod drive mechanism comprising:
   a torque tube with an inner surface defining a central bore;

a control rod assembly including a connecting rod disposed within the central bore of the torque tube, the connecting rod including at least one cam extending radially-outwardly from an outer surface thereof, and an annular collar defining a key slot;

an elongated key that is slidably receivable within the key slot, the elongated key being non-rotatably fixed to the inner surface of the torque tube; and a holdout collar disposed non-rotatably within the torque tube, the holdout collar including an inner surface defining a central bore and at least one locking recess therein, the locking recess including an entry slot extending upwardly from a bottom edge of the holdout collar;

wherein the connecting rod is axially-movable with respect to the torque tube between a first position in which the elongated key is disposed within the key slot so that the connecting rod is non-rotatable with respect to the torque tube, and a second position in which the elongated key is removed from the key slot and the connecting rod is rotatable with respect to the torque tube, wherein when the connecting rod is in the first position the at least one cam is removed from the locking recess, and in the second position the at least one cam is disposed within the locking recess, wherein the at least one locking recess further comprises a camming surface and a lock surface, the camming surface extending from the entry slot to the lock slot.

2. The control rod drive mechanism of claim 1, wherein the lock surface lies in a plane that is transverse to a longitudinal center axis of the torque tube.

3. The control rod drive mechanism of claim 1, wherein:
the at least one cam of the connecting rod includes two cams,
the at least one locking recess of the holdout collar includes two locking recesses.

4. The control rod drive mechanism of claim 1, wherein when the at least one cam is disposed within the entry slot of the at least one locking recess, the key slot is axially aligned with the elongated key.

5. The control rod drive mechanism of claim 1, wherein the control rod assembly further comprises a lead screw, a spider, and a plurality of control rods, the spider being disposed between and securing the connecting rod and the plurality of control rods.

6. The control rod drive mechanism of claim 1, further comprising a spring positioned above a top end of the connecting rod, the spring urging the connecting rod in a downward direction when the at least one cam is disposed within the locking recess.

7. The control rod drive mechanism of claim 6, wherein the spring comprises a coil spring.

8. A holdout mechanism for use with a control rod drive mechanism having a torque tube, comprising:
a connecting rod including at least one cam extending radially-outwardly from an outer surface of the connecting rod, and an annular collar defining a key slot, the annular collar extending radially-outwardly from the outer surface of the connecting rod;
an elongated key that is slidably receivable within the key slot, the elongated key being non-rotatably fixed to an inner surface of the torque tube; and
a holdout collar disposed non-rotatably within the torque tube, the holdout collar including an inner surface defining a central bore and at least one locking recess therein, the locking recess extending upwardly from a bottom edge of the holdout collar;

wherein the connecting rod is axially-movable with respect to the control rod drive mechanism between a first position in which the elongated key is disposed within the key slot so that the connecting rod is non-rotatable with respect to the control rod drive mechanism, and a second position in which the elongated key is removed from the key slot and the connecting rod is rotatable with respect to the control rod drive mechanism, wherein when the connecting rod is in the first position the at least one cam is removed from the locking recess, and in the second position the at least one cam is disposed within the locking recess.

9. The holdout mechanism of claim 8, wherein the at least one locking recess further comprises an entry slot defined by the bottom edge of the holdout collar.

10. The holdout mechanism of claim 9, wherein the at least one locking recess further comprises a camming surface and a lock surface, the camming surface extending from the entry slot to the lock slot.

11. The holdout mechanism of claim 10, wherein the lock surface lies in a plane that is transverse to a longitudinal center axis of the torque tube.

12. The holdout mechanism of claim 8, wherein:
the at least one cam of the connecting rod includes two cams,
the at least one locking recess of the holdout collar includes two locking recesses.

13. The holdout mechanism of claim 9, wherein when the at least one cam is disposed within the entry slot of the at least one locking recess, the key slot is axially aligned with the elongated key.

14. The holdout mechanism of claim 8, further comprising a spring positioned above a top end of the connecting rod, the spring urging the connecting rod in a downward direction when the at least one cam is disposed within the locking recess.

15. The holdout mechanism of claim 14, wherein the spring comprises a coil spring.

16. A holdout mechanism for use with a control rod drive mechanism having a torque tube, comprising:
a connecting rod including at least one cam extending radially-outwardly from an outer surface of the connecting rod, the connecting rod being axially-movable with respect to the control rod drive mechanism between a first position in which the connecting rod is non-rotatable with respect to the control rod drive mechanism, and a second position in which the connecting rod is rotatable with respect to the control rod drive mechanism;
a holdout collar disposed non-rotatably within the torque tube, the holdout collar including an inner surface defining a central bore and at least one locking recess therein, the locking recess extending upwardly from a bottom edge of the holdout collar;
wherein when the connecting rod is in the first position the at least one cam is removed from the locking recess, and in the second position the at least one cam is disposed within the locking recess; and
a spring positioned above a top end of the connecting rod, the spring urging the connecting rod in a downward direction when the at least one cam is disposed within the locking recess.

17. The holdout mechanism of claim 16, further comprising an end cap in which the spring is seated, the spring comprising a coil spring.

* * * * *